US012456879B2

(12) United States Patent
Chen et al.

(10) Patent No.: US 12,456,879 B2
(45) Date of Patent: Oct. 28, 2025

(54) BI-DIRECTIONAL POWER FLOW CONTROL USING A SINGLE BATTERY CHARGER

(71) Applicant: Renesas Electronics America Inc., Milpitas, CA (US)

(72) Inventors: Yen-Mo Chen, Morrisville, NC (US); Rahul Ramesh, Cary, NC (US); Shahriar Jalal Nibir, Apex, NC (US); Sungkeun Lim, Apex, NC (US)

(73) Assignee: Renesas Electronics America Inc., Milpitas, CA (US)

( * ) Notice: Subject to any disclaimer, the term of this patent is extended or adjusted under 35 U.S.C. 154(b) by 205 days.

(21) Appl. No.: 17/989,032

(22) Filed: Nov. 17, 2022

(65) Prior Publication Data

US 2024/0170995 A1    May 23, 2024

(51) Int. Cl.
*H02J 7/34* (2006.01)
*H02J 7/00* (2006.01)

(52) U.S. Cl.
CPC .............. *H02J 7/34* (2013.01); *H02J 7/0063* (2013.01)

(58) Field of Classification Search
CPC .................................. H02J 7/34; H02J 7/0063
USPC ......................................................... 307/21
See application file for complete search history.

(56) References Cited

U.S. PATENT DOCUMENTS

| | | | |
|---|---|---|---|
| 7,893,560 B2 * | 2/2011 | Carter .................... | H02J 9/061 307/64 |
| 9,825,478 B2 * | 11/2017 | Odaohhara ....... | H02J 7/007182 |
| 2011/0163601 A1 * | 7/2011 | Li ............................. | H02J 7/02 307/48 |
| 2020/0295593 A1 * | 9/2020 | Kutkut .................... | H02J 9/061 |
| 2020/0297325 A1 * | 9/2020 | Kazui ...................... | A61B 8/56 |
| 2022/0149644 A1 * | 5/2022 | Liu .......................... | H02J 7/0068 |
| 2024/0204550 A1 * | 6/2024 | Jefremow ............ | H02J 7/00712 |

* cited by examiner

*Primary Examiner* — Michael R. Fin
(74) *Attorney, Agent, or Firm* — SCULLY, SCOTT, MURPHY & PRESSER, P.C.

(57) ABSTRACT

Systems and methods for bi-directional power flow control using a single battery charger are described. According to one example, a semiconductor device is generally described. The semiconductor device may include a charger configured to supply power from a charging interface to a battery in a forward mode, and supply power from the battery to a load in a reverse mode. The semiconductor device may include a first isolation switch disposed between the charging interface and the charger, a second isolation switch disposed between the charger and the load, and a controller configured to enable the first isolation switch and operate the charger in the forward mode, and enable the second isolation switch and operate the charger in the reverse mode.

20 Claims, 3 Drawing Sheets

BI-DIRECTIONAL POWER FLOW CONTROL USING A SINGLE BATTERY CHARGER

BACKGROUND

Unless otherwise indicated herein, the materials described in this section are not prior art to the claims in this application and are not admitted to be prior art by inclusion in this section.

The present disclosure relates in general to systems and methods of controlling semiconductor devices, more particularly, to bi-directional power flow control using a single battery charger.

A rechargeable consumer electronic device typically includes a battery and a charging port. Often, the electronic device includes a battery charger to charge the battery from the charging port and a separate converter, such as a DC-DC power converter, to deliver power from the charged battery to a load within the electronic device. In an electronic device having both a charger and a converter, these components typically consume a large amount of power because they are usually powered on simultaneously, and both components typically require a relatively large amount of space (e.g. printed circuit board footprint). Further, chargers and converters are relatively complex and expensive components. Hence, having both a battery charger and a converter influences the size, weight, power consumption, and cost of the electronic device. As consumer electronic devices are becoming smaller and more disposable, the aspects of size, weight, and cost are becoming more important.

SUMMARY

According to one example, a semiconductor device is generally described. The semiconductor device may include a charger configured to supply power from a charging interface to a battery in a forward mode, and supply power from the battery to a load in a reverse mode. The semiconductor device may include a first isolation switch disposed between the charging interface and the charger, a second isolation switch disposed between the charger and the load, and a controller configured to enable the first isolation switch and operate the charger in the forward mode, and enable the second isolation switch and operate the charger in the reverse mode.

According to this example, the charger may include a charger controller and a power stage, and the charger may be a single bi-directional buck-boost charger. The reverse mode may be disabled in response to the forward mode being enabled, and the forward mode may be disabled in response to the reverse mode being enabled. The controller may be configured to enable the first isolation switch in response to a power source being connected to the charging interface, and enable the second isolation switch in response to the power source being disconnected from the charging interface. The first isolation switch and the second isolation switch may each include a pair of N-channel metal oxide semiconductor field effect transistors (MOSFETs) which are connected back-to-back in a common-source configuration for reverse-current blocking. The battery may include at least one battery cell. The charging interface may be a universal serial bus (USB) port. The load may be a resistive load.

According to another example, a semiconductor device is generally described. A semiconductor device may include a controller configured to enable a first isolation switch disposed between a charging interface and a charger. In response to enabling the first isolation switch, operate the charger in a forward mode to supply power from the charging interface to a battery, enable a second isolation switch disposed between the charger and a load. In response to enabling the second isolation switch, operate the charger in a reverse mode to supply power from the battery to the load.

According to this example, the charger may include a charger controller and a power stage, and the charger may be a single bi-directional buck-boost charger. The reverse mode may be disabled in response to the forward mode being enabled, and the forward mode may be disabled in response to the reverse mode being enabled. The controller may be configured to enable the first isolation switch in response to a power source being connected to the charging interface, and enable the second isolation switch in response to the power source being disconnected from the charging interface. The first isolation switch and the second isolation switch may each include a pair of N-channel metal oxide semiconductor field effect transistors (MOSFETs) which are connected back-to-back in a common-source configuration for reverse-current blocking. The battery may include at least one battery cell. The charging interface may be a universal serial bus (USB) port. The load may be a resistive load.

According to yet another example, a method for operating a charger is generally described. The method may include enabling, by a controller, a first isolation switch disposed between a charging interface and a charger. In response to enabling the first isolation switch, operating the charger in a forward mode to supply power from the charging interface to a battery, enabling, by the controller, a second isolation switch disposed between the charger and a load, and in response to enabling the second isolation switch, operating the charger in a reverse mode to supply power from the battery to the load.

According to this example, the charger may include a charger controller and a power stage, and the charger may be a single bi-directional buck-boost charger. Before enabling the first isolation switch, the method may further include determining a power source is connected to the charging interface, and if the second isolation switch is enabled, disabling the second isolation switch. Before enabling the second isolation switch, the method may further include determining a power source is not connected to the charging interface, and if the first isolation switch is enabled, disabling the first isolation switch. The first isolation switch and the second isolation switch may each include a pair of N-channel metal oxide semiconductor field effect transistors (MOSFETs) which are connected back-to-back in a common-source configuration for reverse-current blocking. The battery may include at least one battery cell. The charging interface may include a universal serial bus (USB) port. The load may be a resistive load.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

To be described in more detail below, a bi-directional power flow technique can be implemented by a system described in accordance with the present disclosure. The system can provide a bi-directional power flow controller (e.g., having a controller and a circuit coupled to a battery) that can be relatively compact, allowing the bi-directional power flow control technique described herein to fit in applications with limited size, weight, and cost. The described solution recognizes that it is not necessary for a charger and a controller to be operating at the same time in some applications. Thus, the described solution eliminates the need for a separate charger and power converter to significantly improve the efficiency of the system while reducing the overall size (e.g. printed circuit board footprint), weight, and cost. Moreover, the system can provide an efficient battery charging and discharging technique for use with various consumer electronic devices.

Figure 1:
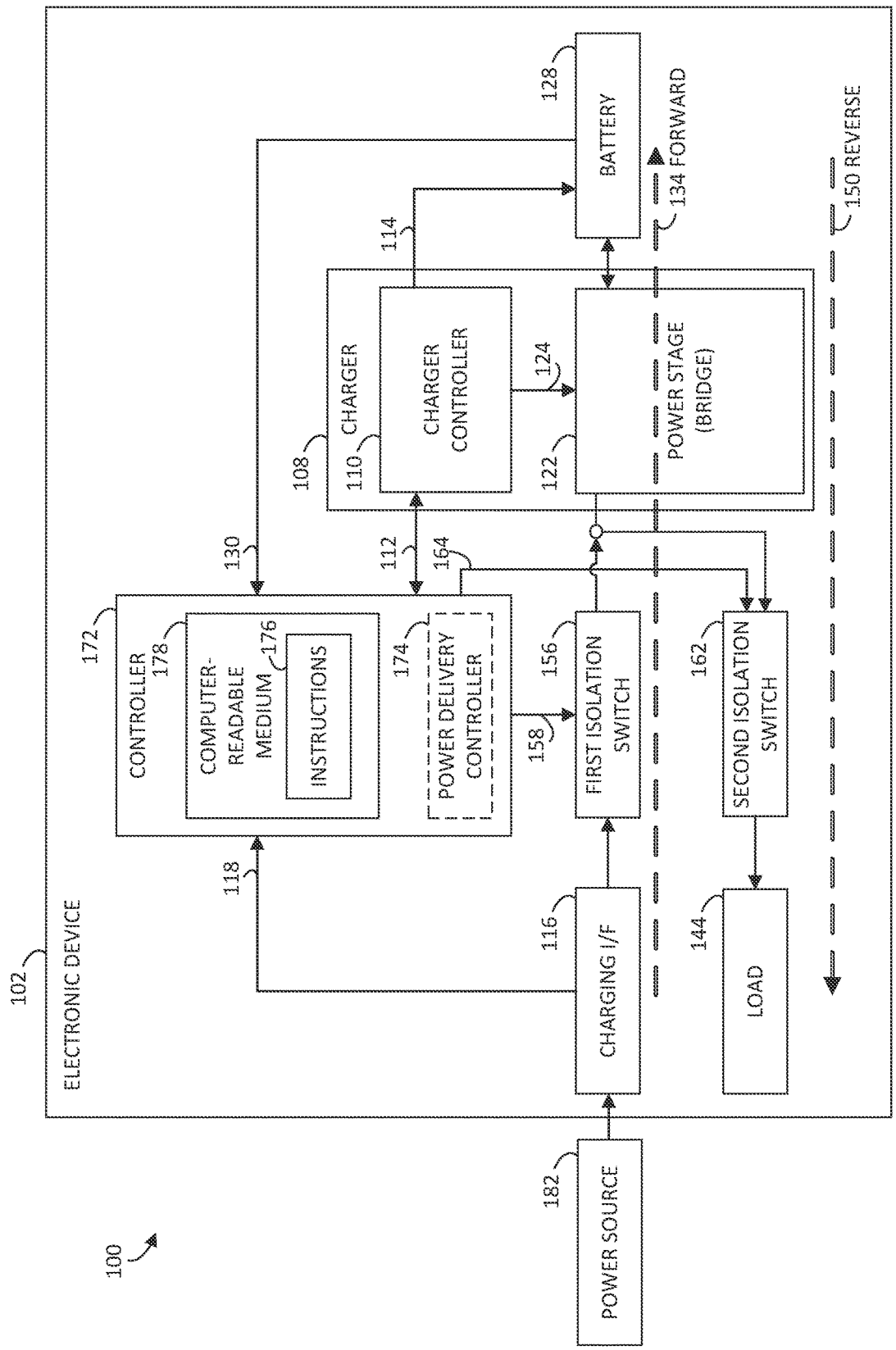
FIG. 1 illustrates an example of an electronic system that can implement bi-directional power flow control using a single battery charger in accordance with various examples of the present disclosure.

FIG. 1 illustrates an example of an electronic system 100 that can implement bi-directional power flow control using a single battery charger in accordance with various examples of the present disclosure. Electronic system 100 may include an electronic device 102 which can be implemented generally as a semiconductor device including one or more semiconductor circuits, semiconductor chips, and the like. According to an example, electronic device 102 may include a charger 108 configured to supply power from a charging interface 116 through a power stage 122 (e.g. a bridge circuit) to a battery 128 in a forward mode 134, and configured to supply power from battery 128 through power stage 122 to a load 144 in a reverse mode 150. The terms forward and reverse refer generally to the direction of power flow into and out of battery 128 through power stage 122. Stated differently, forward mode refers generally to charging battery 128, while reverse mode refers generally to discharging battery 128. The term bi-directional refers to the capability of both charging in a forward mode 134 direction and discharging in a reverse mode 150 direction.

Battery 128 may be implemented as a nickel-metal hydride (NiMH), Nickel-Cadmium (NiCd), or Lithium Ion (Li-ion) battery of various voltage and current capacities for use in supplying power to various loads including resistive loads, inductive loads, or capacitive loads for various consumer electronic devices such as a heater coil for an electronic cigarette, a mobile audio/recording device, a wearable electronic device, a tablet computer, and the like. Charger 108 may be implemented as a single device such as single buck-boost charger. Charger 108 may also be implemented by another device having capabilities described herein, or a combination of a devices.

A first isolation switch 156 may be disposed between charging interface 116 and power stage 122 to control power flow from charging interface 116 to charger 108. As used herein, charger 108 includes a combination of charger controller 110 and power stage 122. Charger controller 110 is configured to operate power stage 122 to conduct power to and from battery 128, as described. When first isolation switch 156 is enabled by asserting a first switch control signal 158, power is permitted to flow from charging interface 116 through charger 108. When first isolation switch 156 is not enabled, power is prevented from flowing from charging interface 116 to charger 108 so that charging interface 116 is isolated from charger 108. Similarly, a second isolation switch 162 may be disposed between charger 108 and load 144 to control power flow from charger 108 to load 144. When second isolation switch 162 is enabled by asserting a second switch control signal 164, power is permitted to flow through charger 108 to load 144. When second isolation switch 162 is not enabled, power is prevented from flowing from charger 108 to load 144 so that charger 108 is isolated from load 144. In this manner, charger 108 may be isolated from an input power path from charging interface 116 and isolated from an output power path to load 144. Both first isolation switch 156 and second isolation switch 162 may be disabled at the same time, and either may be enabled exclusively so that first isolation switch 156 may be enabled only while second isolation switch 162 is disabled and second isolation switch 162 may be enabled only while first isolation switch 156 is disabled.

A controller 172 may be a processor device configured to execute program instructions. Controller 172 and may be coupled to and configured to enable first isolation switch 156 by asserting first switch control signal 158 and configured to operate charger 108 in forward mode 134. Similarly, controller 172 may be coupled to and configured to enable second isolation switch 162 by asserting second switch control signal 164 and configured to operate charger 108 in reverse mode 150. A power source 182 may be coupled to charging interface 116 and configured to provide power to semiconductor device 102 through first isolation switch 156, when enabled, and through charger 108. Charging interface 116 may also provide a charging interface status signal 118 indicating power is applied from power source 182 to charging interface 116 to support detection, discovery, or recognition of power source 182 being connected to (or later disconnected from) charging interface 116, for example. Charging interface 116 may be implemented as a universal serial bus (USB) port complying with a USB standard such as USB2.0, USB3.0, and/or various proprietary standards, etc. Alternatively, charging interface 116 may connect with a suitable direct current (DC) power source. Battery 128 may be a battery module including a plurality of battery cells configured to store and retrieve power along with various conditioning components such as an isolation element to decouple battery 128 from under control of charger 108. Battery 128 may receive one or more control signals and provide one or more status signals 130 to controller 172 indicating the status of the battery such as the battery voltage, state of charge, and/or a dynamic measure of battery health and response during charging and/or discharging.

Controller 172 may be coupled to charger 108 and configured to operate charger 108 in forward mode 134 and reverse mode 150, as described above. Controller 172 provides control to charger controller 110 and receives status from charger controller 110 through one or more charger control and status signals 112. Charger controller 110 may also apply one or more control signals 114 to battery 128 and one or more control signals 124 to power stage 122, as will be described more fully below in reference to FIG. 2. Charger controller 110 may be implemented as a processor alone or may be used in combination with a processor device configured to execute program instructions along with discrete and/or active components to receive and store configuration information related to program instructions. Controller 172 may be implemented as a processor alone or may be used in combination with a specialized power delivery controller 174 having different signal driving characteristics than controller 172. Power delivery controller 174 may be a processor device configured to execute program instructions and may be operatively connected with first isolation switch 156, second isolation switch 162, charger 108, charging interface 116, and/or battery 128, as described above. to provide control to and/or receive status from each of these electronic devices. Alternatively, power delivery controller 174 may be a module or a functional block within controller 172 with operations that are controlled by execution of program code. Controller 172 and/or power delivery controller 174 may execute program instructions, as will be described more fully below.

Figure 2:
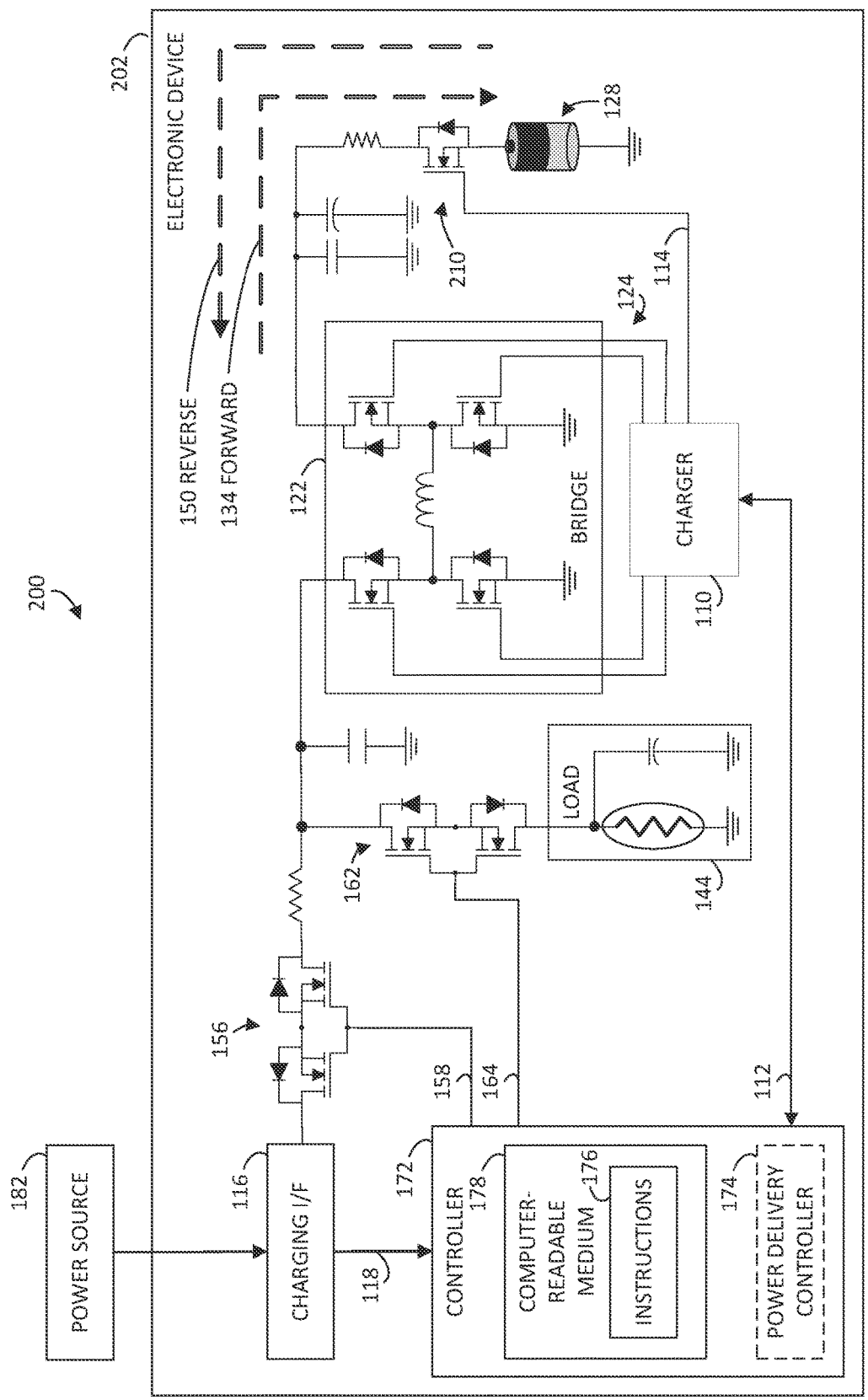
FIG. 2 illustrates an example of another electronic system that can implement bi-directional power flow control using a single battery charger in accordance with various examples of the present disclosure.

FIG. 2 illustrates another example of an electronic system 200 that can implement bi-directional power flow control using a single battery charger in accordance with various examples of the present disclosure. The example of FIG. 2 is similar in some ways to FIG. 1. Electronic system 200 may include an electronic device 202 which can be implemented generally as a semiconductor device including one or more semiconductor circuits, semiconductor chips, and the like.

According to an example, electronic device 202 may include charger 108 configured to supply power from charging interface 116 through charger 108 to battery 128 in forward mode 134, and configured to supply power from battery 128 through charger 108 to load 144 in reverse mode 150. Although battery 128 is illustrated as having one battery cell, it is understood that battery 128 may be a battery module, along with various conditioning components (capacitors, resistors, etc.) including a plurality of battery cells that may be arranged in a series configuration (e.g. battery cell voltages add), a parallel configuration (e.g. battery cell capacities add), or a series-parallel configuration (e.g. both battery cell voltages and battery cell capacities add) based on the power utilization and power conditioning demands of electronic device 202. In this manner, a single battery charger (e.g., charger 108) may be used to both charge and discharge one or a plurality of batteries associated with battery 128 (e.g., battery module). Further, in an actual implementation of the present solution, additional discrete, active, or reactive components may be needed.

Both first isolation switch 156 and second isolation switch 162 may include a pair of N-channel metal oxide semiconductor field effect transistors (MOSFETs) which are connected back-to-back in a common-source configuration for blocking current flowing in a direction from charger 108 toward charging interface 116 through first isolation switch 156, or blocking current flowing in a direction from load 144 toward charger 108 through second isolation switch 162, also called reverse-current blocking. Charger 108 may also apply one or more control signals 114 to various conditioning elements (e.g., or isolation element 210) associated with battery 128 in order to enable charging and discharging of battery 128. One such conditioning element, for coupling and/or decoupling and preventing reverse voltage being applied to battery 128 based on control signal 114, may include an N-channel MOSFET. Also, load 144 may include a heater coil for an electronic cigarette, or another resistive load, for example. According to an alternative embodiment, while load 144 is shown as integral with and electronic device 202, controller 172 may disable second isolation switch 162 in response to detection that load 144 has been disconnected, load 144 becomes an open connection, or controller 172 detects an excessive voltage or current indicating an anomalous condition has occurred.

Figure 3:
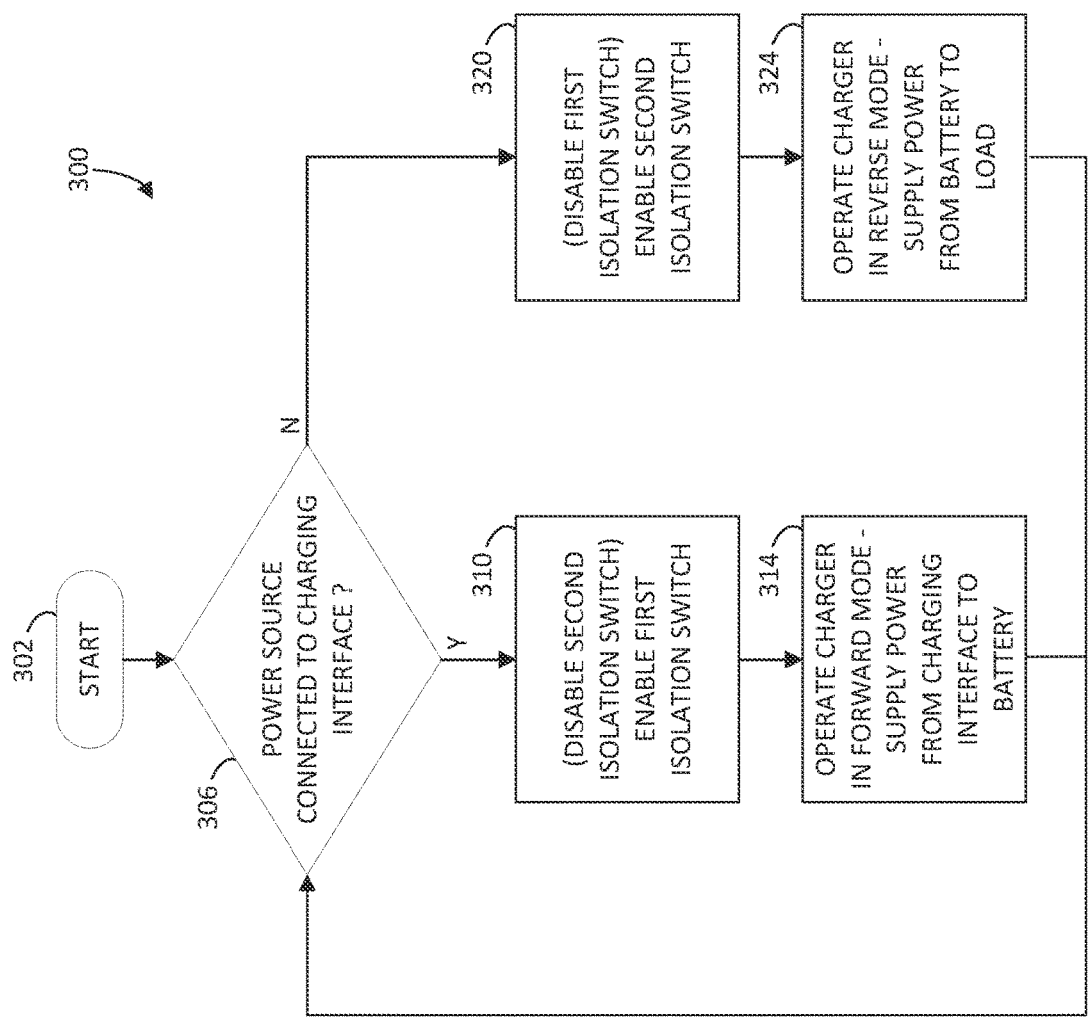
FIG. 3 is a flow diagram illustrating a method of controlling power flow using a single battery charger in accordance with various examples.

FIG. 3 illustrates a flow chart of an example process (or method) 300 that can implement controlling power flow using a single battery charger in accordance with various examples of the present disclosure. Process 300 may be implemented on hardware such as electronic system 100 described in reference to FIGS. 1 and 2. An example process may include one or more operations, actions, or functions as illustrated by one or more of steps 306-324 (e.g. blocks 306-324), as illustrated in FIG. 3. Although illustrated as discrete blocks, various blocks may be divided into additional blocks, combined into fewer blocks, eliminated, performed in a different order, or performed in parallel, when not prohibited, depending on the desired implementation.

Process 300 begins in step 302 and proceeds to step 306 (e.g. block 306) with determining whether power source 182 is operatively connected to charging interface 116 and power source 182 is supplying power to charging interface 116 based, for example, on controller 172 receiving interface status signal 118. When power source 182 is connected to charging interface 116 (step 306 (Y)), process 300 proceeds to step 310 where second isolation switch 162 is disabled (if it was previously enabled) and first isolation switch 156 is enabled. Process 300 then proceeds to step 314 where controller 172 operates charger 108 in forward mode 134 to charge battery 128. Process 300 then proceeds to step 306 with determining whether power source 182 remains operatively connected to charging interface 116 based on interface status signal 118, for example. When power source 182 remains connected to charging interface 116, process 300 proceeds to step 310 where first isolation switch 156 is maintained as enabled. Process 300 then proceeds again to step 314 where controller 172 continues to operate charger 108 in forward mode 134 to charge battery 128. Process 300 then proceeds again to step 306 with determining whether power source 182 remains operatively connected to charging interface 116 based on interface status signal 118, for example.

When power source 182 is not operatively connected to charging interface 116 (step 306 (N)), or power source 182 is not supplying power to charging interface 116 (e.g. power source 182 may be disconnected, turned off, or discharged), process 300 proceeds to step 320 where first isolation switch 156 is disabled (if it was previously enabled) and second isolation switch 162 is enabled. Process 300 then proceeds to step 324 where controller 172 operates charger 108 in reverse mode 150 to discharge battery 128 to supply power to load 144. Process 300 then proceeds to step 306 with determining whether power source 182 remains operatively disconnected and not providing power to charging interface 116 based on interface status signal 118, for example. When power source 182 remains not operatively connected to charging interface 116, or is not effectively supplying power to charging interface 116, process 300 proceeds again to step 320 where first isolation switch 156 remains disabled and second isolation switch 162 remains enabled. Process 300 then proceeds to step 324 where controller 172 operates charger 108 in reverse mode 150 to discharge battery 128 to supply power to load 144. Process 300 then proceeds again to step 306 with determining whether power source 182 remains operatively disconnected and not providing power to charging interface 116 based on interface status signal 118. In this manner, process 300 is not intended to terminate while power is applied to controller 172 and/or power delivery controller 174, so this process of method 300 is intended to continue indefinitely with charging and discharging battery 128, as described above.

With reference to both FIGS. 1 and 2, controller 172 and specialized power delivery controller 174, separately or in combination, may be implemented to read program instructions 176 (e.g. computer implemented code) from a non-transitory computer-readable medium 178 such as a read-only memory (ROM), a random access memory (RAM), a programmable logic device (PLD), a flash drive, a memory card/stick, a solid-state storage device, or the like. Program instructions, read from computer-readable medium 178 by either controller 172 and/or specialized power delivery controller 174, may cause these processor devices, individually or in cooperation with each other, to execute operations corresponding to the functions described above with reference to FIGS. 1-3. In particular, controller 172 and/or specialized power delivery controller 174 may execute instructions that perform functions corresponding to the processes (e.g. the methods) described in reference to FIGS. 1-3. Computer-readable medium 178 may be removable or replaceable or re-writeable so that program instructions 176 in computer-readable medium 178 may be modified, upgraded, or replaced.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The various embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device, comprising:
   a bi-directional buck-boost charger configured to:
   supply power from a charging interface of an electronic device to a battery in the electronic device in a forward mode; and
   supply power from the battery, via the bi-directional buck-boost charger, to a load in the electronic device in a reverse mode;
   a first isolation switch disposed between the charging interface and the bi-directional buck-boost charger;
   a second isolation switch disposed between the bi-directional buck-boost charger and the load; and
   a controller configured to:
   enable the first isolation switch and disable the second isolation switch to operate the bi-directional buck-boost charger in the forward mode, wherein under the forward mode, the load in the electronic device is isolated from the charging interface of the electronic device and the battery in the electronic device; and
   enable the second isolation switch and disable the first isolation switch to operate the bi-directional buck-boost charger in the reverse mode.

2. The semiconductor device of claim 1, wherein the bi-directional buck-boost charger includes a charger controller and a power stage.

3. The semiconductor device of claim 1, wherein:
   the reverse mode is disabled in response to the forward mode being enabled; and
   the forward mode is disabled in response to the reverse mode being enabled.

4. The semiconductor device of claim 1, wherein the controller is configured to:
   enable the first isolation switch in response to a power source being connected to the charging interface; and
   enable the second isolation switch in response to the power source being disconnected from the charging interface.

5. The semiconductor device of claim 1, wherein the first isolation switch and the second isolation switch each comprise a pair of N-channel metal oxide semiconductor field effect transistors which are connected back-to-back in a common-source configuration for reverse-current blocking.

6. The semiconductor device of claim 1, wherein the battery comprises at least one battery cell.

7. The semiconductor device of claim 1, wherein the charging interface is a universal serial bus port.

8. The semiconductor device of claim 1, wherein the load is a resistive load.

9. A semiconductor device, comprising:
   a controller configured to:
   enable a first isolation switch disposed between a charging interface of a device and a bi-directional buck-boost charger in the electronic device and disable a second isolation switch disposed between the bi-directional buck-boost charger and a load in the electronic device;
   in response to enabling the first isolation switch and disabling the second isolation switch, operate the bi-directional buck-boost charger in a forward mode to supply power from the charging interface to a battery in the electronic device;
   enable the second isolation switch and disable the first isolation switch; and
   in response to enabling the second isolation switch and disabling the first isolation switch, operate the bi-directional buck-boost charger in a reverse mode to supply power from the battery, via the bi-directional buck-boost charger, to the load in the electronic device,
   wherein, under the forward mode, the load is isolated from the charging interface and the battery.

10. The semiconductor device of claim 9, wherein the bi-directional buck-boost charger includes a charger controller and a power stage.

11. The semiconductor device of claim 9, wherein:
the reverse mode is disabled in response to the forward mode being enabled; and
the forward mode is disabled in response to the reverse mode being enabled.

12. The semiconductor device of claim 9, wherein the controller is configured to:
enable the first isolation switch in response to a power source being connected to the charging interface; and
enable the second isolation switch in response to the power source being disconnected from the charging interface.

13. The semiconductor device of claim 9, wherein the first isolation switch and the second isolation switch each comprise a pair of N-channel metal oxide semiconductor field effect transistors which are connected back-to-back in a common-source configuration for reverse-current blocking.

14. The semiconductor device of claim 9, wherein at least one of:
the battery comprises at least one battery cell;
the charging interface is a universal serial bus port; and
the load is a resistive load.

15. A method for operating a bi-directional buck-boost charger, the method comprising:
enabling, by a controller, a first isolation switch disposed between a charging interface of an electronic device and a bi-directional buck-boost charger in the electronic device;
disabling, by the controller, a second isolation switch disposed between the bi-directional buck-boost charger and a load in the electronic device;
in response to enabling the first isolation switch and disabling the second isolation switch, operating the bi-directional buck-boost charger in a forward mode to supply power from the charging interface to a battery;
enabling, by the controller, second isolation switch;
disabling, by the controller, the first isolation switch; and
in response to enabling the second isolation switch and disabling the first isolation switch, operating the bi-directional buck-boost charger in a reverse mode to supply power from the battery, via the bi-directional buck-boost charger, to the load,
wherein under the forward mode, the load is isolated from the charging interface and the battery.

16. The method of claim 15, wherein the bi-directional buck-boost charger includes a charger controller and a power stage.

17. The method of claim 15, before enabling the first isolation switch, the method further comprising:
determining a power source is connected to the charging interface; and
if the second isolation switch is enabled, disabling the second isolation switch.

18. The method of claim 15, before enabling the second isolation switch, the method further comprising:
determining a power source is not connected to the charging interface; and
if the first isolation switch is enabled, disabling the first isolation switch.

19. The method of claim 15, wherein the first isolation switch and the second isolation switch each comprise a pair of N-channel metal oxide semiconductor field effect transistors which are connected back-to-back in a common-source configuration for reverse-current blocking.

20. The method of claim 15, wherein at least one of:
the battery comprises at least one battery cell;
the charging interface is a universal serial bus port; and
the load is a resistive load.

* * * * *